United States Patent [19]

Albrecht et al.

[11] 3,757,653
[45] Sept. 11, 1973

[54] FILM MARKING SYSTEM

[75] Inventors: Richard E. Albrecht; Terrence L. Reeder, Rochester, N.Y.

[73] Assignee: Eastman Kodak Company, Rochester, N.Y.

[22] Filed: Oct. 26, 1971

[21] Appl. No.: 192,132

[52] U.S. Cl. .................................. 95/1.1, 355/64
[51] Int. Cl. ............................................ G03b 17/24
[58] Field of Search ................... 95/1.1; 350/286; 355/64

[56] References Cited
UNITED STATES PATENTS

| 2,999,414 | 9/1961 | Stamm | 350/286 |
| 2,420,506 | 5/1947 | Strang | 350/286 |
| 2,871,088 | 1/1959 | Abell | 95/1.1 X |
| 2,821,106 | 1/1958 | Ranft | 95/1.1 |
| 2,868,064 | 1/1959 | Henkel | 95/1.1 |
| 2,871,088 | 1/1959 | Abell | 346/1 |

Primary Examiner—John M. Horan
Attorney—W. H. J. Kline

[57] ABSTRACT

An optical system for restricting the spread angle of a light beam and placing a mark on a film that includes a prism which transmits only those light rays within the desired spread angle and a lens which focuses the light beam onto the film. The prism and lens may be formed into a one-piece molded light pipe.

4 Claims, 3 Drawing Figures

RICHARD E. ALBRECHT
TERRENCE L. REEDER
INVENTORS

BY Robert F Brothers
W. H. J. Heine
ATTORNEYS

FILM MARKING SYSTEM

BACKGROUND OF THE INVENTION

1. Field of the Invention

This invention relates to optical systems for restricting the spread angle of a light beam and, in particular, to such a system for use in exposing image designator marks onto a microfilm in a high speed microfilmer.

2. Description of the Prior Art

High speed retrieval of documents photographed on microfilm requires that an image designator mark be exposed on the microfilm along with the document image. The designator marks may then be detected and counted by a film reader so that a particular document image may be retrieved. The designator mark is generally rectangular in shape and must be precisely located on the film with respect to its associated document image. Moreover, the document images are extremely small and close together and no spurious light from the designator mark system may impinge upon the document image. Finally, the designator mark must have extremely sharp edges in order to properly trigger the film reader in the retrieval equipment when the marks are close together.

Many optical systems are known for placing a mark on a film. Systems which utilize mirrors or lenses, such as disclosed in U.S. Pat. Nos. 2,552,266, 2,458,882 and 2,331,113, suffer from several defects. First, the optical systems are relatively complex and must be maintained in proper alignment both longitudinally and laterally in order to produce a sharp image which is precisely positioned on the microfilm. Second, the light source utilized with such an optical system is usually stopped down by an aperture in order to permit the optical system to transmit a reasonably collimated light beam to a focussing lens. This necessitates a relatively large and bright light source in order to provide sufficient illumination to produce a usable designator mark on the microfilm. Third, different lens systems should be used for document imaging and mark imaging in order to prevent changes in mark size and location when the image reduction ratio of the microfilming unit is changed.

Simpler systems such as disclosed in U.S. Pat. Nos. 3,212,399 and 2,952,504, utilize a light transmissive material which is positioned adjacent to the film to place a mark on the film. Such systems also require a relatively large and bright light source since only a small portion of the available light is directed onto the film. Moreover, such systems do not produce a sharp mark, as the light beam is not collimated or focussed.

SUMMARY OF THE INVENTION

An object of the present invention is to provide an improved optical system for restricting the spread angle of a light beam.

Another object of the present invention is to provide such a light beam spread angle restricting system which is simple in construction and relatively compact in physical dimensions.

Another object of this invention is to provide an optical system for restricting the spread angle of a light beam which utilizes essentially the entire light emitting area of a light source.

Another object of the present invention is to provide an optical system for placing an image designator mark in association with a document image on a microfilm.

Another object of this invention is to provide such an image designator mark system which is simple in construction and relatively compact in physical dimensions.

These and other objects are accomplished according to the present invention by a prism made of a refractive material characterized by a known critical angle. The relative orientation of the prism walls and the optical alignment of the prism are selected so that the spread angle of a light beam transmitted through the prism from a light source is limited to a predetermined angle. A light ray from the source is transmitted to the entrance wall of the prism and, so long as the ray's angle of incidence on the internal walls of the prism exceeds the critical angle for the material used in the prism, the light ray will be transmitted through the prism. Any light ray which is incident on an internal wall at an angle less than the critical angle will pass out of the prism and, thus, not be included within the transmitted light beam.

In a preferred embodiment, such a prism is incorporated with a cylindrical focussing lens into a one-piece molded light pipe for use in forming an image designator mark in a microfilmer. The prism restricts the spread angle of a light beam passing into it through the light pipe with the light beam being focussed by the cylindrical lens into a designator mark on the microfilm.

BRIEF DESCRIPTION OF THE DRAWINGS

In the detailed description of the preferred embodiments presented below, reference is made to the accompanying drawings wherein.

DESCRIPTION OF THE PREFERRED EMBODIMENT

Because microfilming equipment is well known, the present description will be directed, in particular, to elements of a microfilming system included in the film marking system of this invention. Elements of the microfilming system not specifically described may take any form well known in the art.

Figure 1:
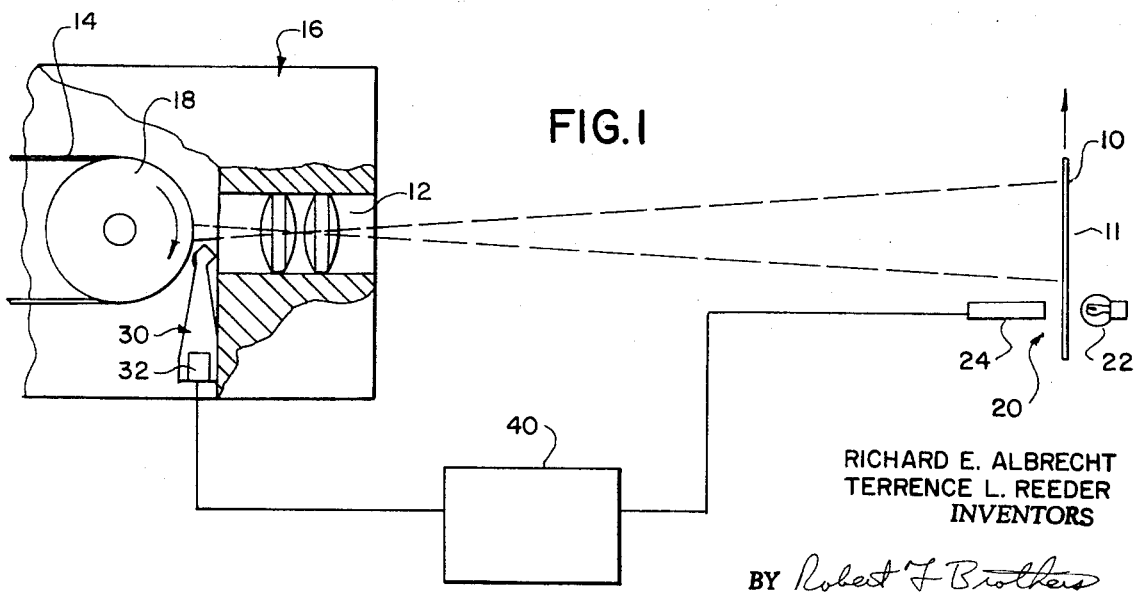
FIG. 1 is a schematic representation of a microfilm system incorporating the film marking system of this invention.
Figure 2:
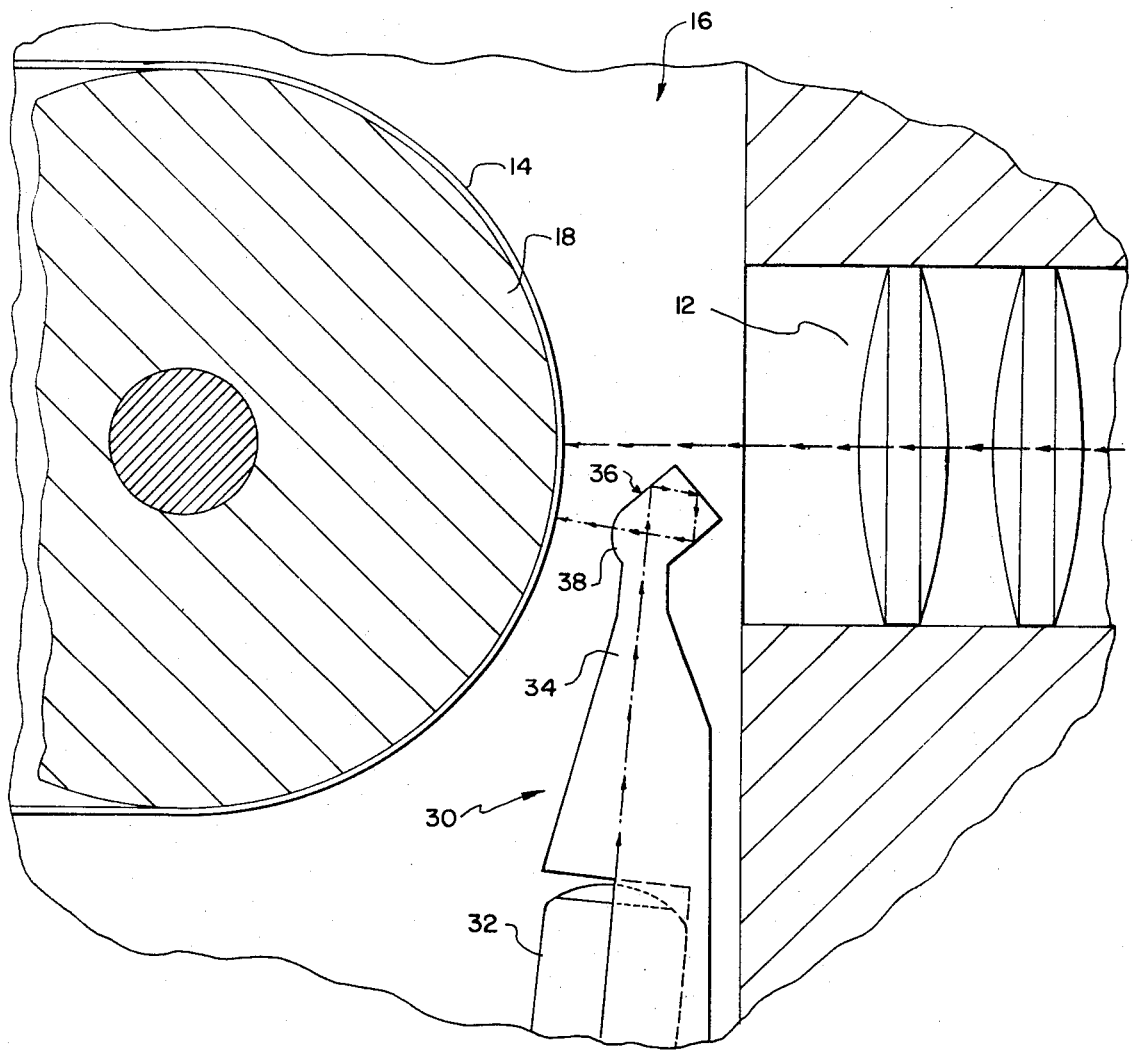
FIG. 2 is an enlarged view of the film marking system of this invention.

Referring now to FIG. 1, a document 10 is positioned at a microfilming station 11 so that an image of document 10 is transmitted by lens system 12 onto microfilm 14, which is being moved through microfilming unit 16 by a rotary drive wheel 18. A document detecting unit, shown generally as 20, is positioned adjacent to microfilming station 11 and consists of a light source 22 and a light sensitive element 24. An image designator mark unit 30 is positioned adjacent to rotary drive wheel 18 and consists of a light source 32, a light pipe 34, a prism 36 and a cylindrical lens 38, as may best be seen in FIG. 2. Document detecting unit 20 and image designator mark unit 30 are electrically interconnected by a control unit 40 which serves to properly position and time the image designator mark to be placed on microfilm 14.

When a document 10 is to be copied, it is moved upwardly through detection unit 20 into position at microfilming station 11. In passing through unit 20, it interrupts the light rays passing to light sensitive element 24, thereby generating an electrical signal to control unit 40. Control unit 40, in turn, transmits an electrical signal to image designator mark unit 30 which actuates light source 32. Light is transmitted by light pipe 34 from light source 32 to prism 36, being reflected around prism 36 in a manner which will be more fully described below, and is focused by lens 38 as a mark on microfilm 14. As microfilm 14 is being moved by rotary wheel 18, the length of the mark placed on microfilm 14 may be controlled by the duration of the signal actuating light source 32 of designator mark unit 30. The positioning of the mark on microfilm 14 is controlled by the introduction of a time delay of suitable length by control unit 40 after receipt of the electrical signal from document detection unit 20. The density of the mark is controlled by the intensity of light source 32.

Figure 3:
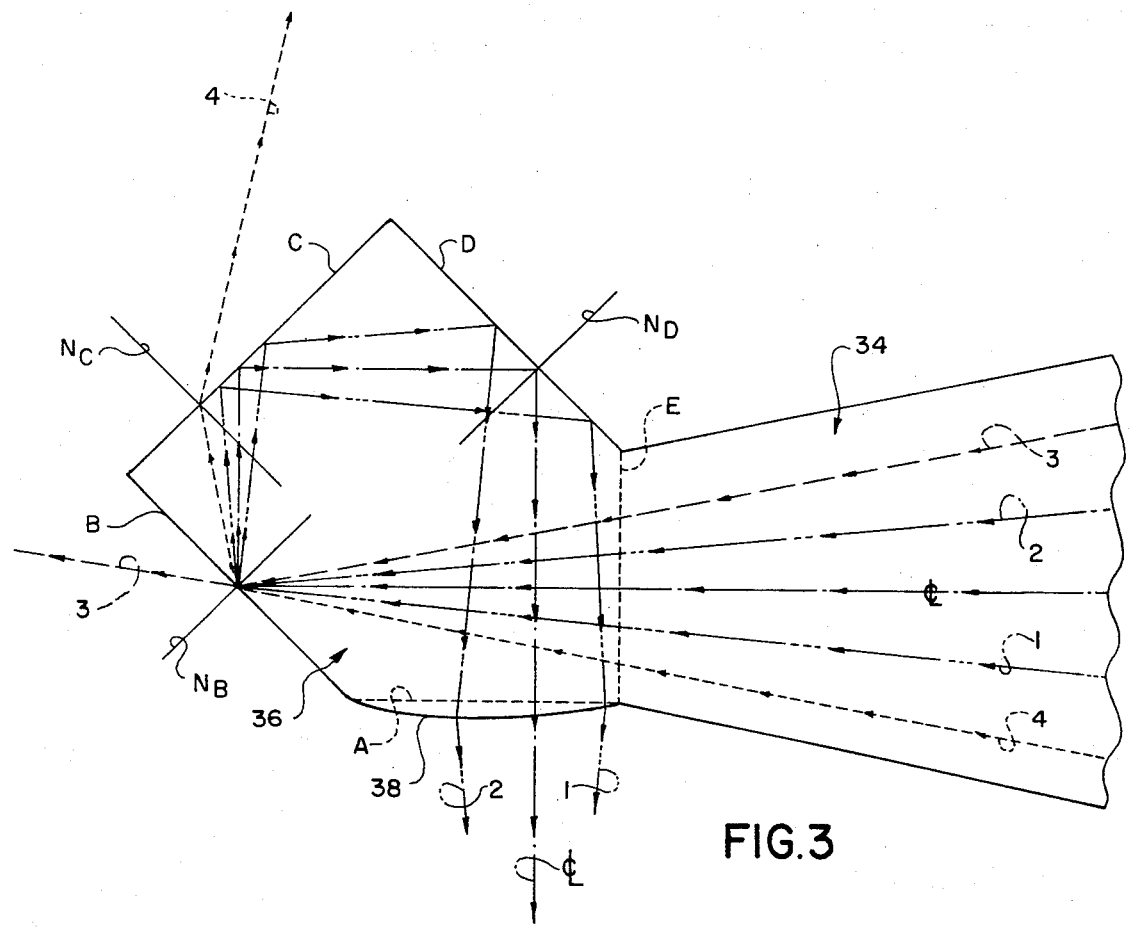
FIG. 3 is an enlarged cross-sectional view of the one-piece prism and lens structure of the film marking system of this invention illustrating the restricting of the spread angle of light rays passing therethrough and the focussing of the light rays.

Referring now to FIG. 3, prism 36 and lens 38, which are incorporated in designator mark unit 30, are shown in an enlarged cross-sectional view in order to better illustrate how prism 36 restricts the spread angle of the light beam. Designator mark unit 30 is molded of a material which is characterized by a known critical angle. This material is selected so that the difference between the critical angle for the material and predetermined design angles for the walls of prism 36 is the spread angle to which the light beam is to be restricted. For example, if it is desired to restrict the spread angle to about 3° half angle or 6° total angle, mark unit 30 may be molded of acrylic plastic which is characterized by a critical angle of 42° 10'. Prism 36 is then designed with walls having normals oriented at an angle of 45° with respect to the optical centerline, resulting in a difference angle of 2° 50'. It has been found that an incident beam, originally symmetric with respect to the optical centerline, will then be restricted to a spread angle of 5° 40'. Other choices of material or wall design angles will result in a narrower or wider spread angle.

In the embodiment illustrated in FIG. 3, designator mark unit 30 is molded of acrylic plastic and includes prism 36 which has five sides denoted as A, B, C, D and E, each side being planar and defining a normal $N_A$, $N_B$, $N_C$, $N_D$ and $N_E$ respectively. It may be seen that exit side A and entrance side E of prism 36 are imaginary. Prism 36 is formed with an angle of 90° between sides A and E, side B and C, and sides C and D, respectively, while sides A and B, and sides D and E intersect at angles of 135°, respectively. Prism 36 is oriented so that the optical centerline of the light beam emitted by light source 32 and transmitted through light pipe 34 is normal to entrance side E, i.e., parallel to $N_E$. The optical centerline thus intersects sides B, C and D at an angle of 45° with respect to $N_B$, $N_C$ and $N_D$, respectively and passes through exit side A parallel to $N_A$. Those light rays which are parallel to the optical centerline will be transmitted through the entire prism parallel to the centerline and will be focused by cylindrical lens 38 as part of the image designator mark. Light rays 1 and 2 in FIG. 3 illustrate rays which are within the desired spread angle of the beam and which are also reflected around the entire prism to be focused by cylindrical lens 38. Light ray 1 is initially at an angle of 2° 50' with respect to the optical centerline. It passes through entrance side E without being refracted and strikes side B of prism 36 at an angle of 47° 50' with respect to normal $N_B$, being totally reflected by that side as its angle of incidence is greater than the critical angle of prism 36. Light ray 1 then strikes side C at an incident angle of 42° 10' with respect to normal $N_C$, which is the limiting angle for total reflection by side C and is reflected so as to strike side D at an incident angle of 47° 50' with respect to normal $N_D$. After total reflection by side D, light ray 1 passes out of prism 36 through exit side A at an angle of 2° 50' from the optical centerline to be focused by lens 38 as part of the designator mark. Ray 2 is also at an angle of 2° 50' from the optical centerline and also experiences total reflection at sides B, C and D because its incident angle at each side never drops below the critical angle of 42° 10'. Substantially all of the light rays which lie between light rays 1 and 2 will also be reflected around the entire prism and will be focused by cylindrical lens 38 as part of the image designator mark.

Light ray 3 illustrates a light ray which lies outside of the desired spread angle and which will not be transmitted around the entire prism. Assuming it is initially at an angle greater than 2° 50' with respect to the optical centerline, it will strike side B at an angle which is less than 42° 10' with respect to $N_B$ and therefore will be refracted through that side and will pass out of prism 36 as illustrated. A light ray 4, which initially is at an angle greater than 2° 50' with respect to the optical centerline, will be totally reflected by side B since its incident angle with respect to $N_B$ is greater than the critical angle but will be refracted through side C since its incident angle with respect to $N_C$ is less than the critical angle. It therefore passes out of prism 36 as illustrated. Thus, substantially all of the light rays which lie outside of the desired spread angle will be refracted out of prism 36 before reaching exit side A.

While the preferred embodiment has been described with reference to a prism 36 molded of a particular material and in which sides A, B, C, D and E are at specified angles with respect to each other and which is oriented in a specified manner with respect to the optical centerline, it is to be understood that the practice of this invention is not limited to the specific design described in the preferred embodiment. The light beam may be restricted to other desired spread angles by selection of a material having a different index of refraction and critical angle, or by modification of the angles between sides B and C, or by varying the orientation of the centerline of the optical system with respect to side B. Thus, it is possible to limit the spread angle to any desired angle and not the limited case of approximately 3° as illustrated above. Moreover, sides A and D are not necessary to the practice of the present invention in controlling the spread angle of the light beam but are incorporated into the image designator mark unit to provide a 90° turn in the axis of the optical system. Thus, the prism could be replaced by a simple triangular prism which could be utilized to control the spread angle of a light beam without introducing a 90° turn in the optical axis. Such a prism could control the spread angle on both sides of the optical centerline by total reflection from two internal walls or could be used to limit the spread on only one side of the optical centerline by total reflection from one internal wall of the prism. Moreover, the use of a prism is not critical to the practice of this invention as any surface which either reflects or refracts a litht beam depending upon whether its incident angle is greater or less than a critical angle, which may be used to restrict the spread angle of the light beam. Finally, the spread angle may be controlled in more than one plane by the addition of another pair of reflecting/refracting surfaces in the light path which are designed in terms of critical angle, optical orientation, and angle between the surfaces to produce the desired spread angle in another plane.

The invention has been described in detail with particular reference to the preferred embodiments thereof, but it will be understood that variations and modifications can be effected within the spirit and scope of the invention.

We claim:

1. For use in a photographic copying machine having means for sequentially copying documents onto a photosensitive surface and an optical system for forming a document image designator mark on the photosensitive surface in association with each image of a document, the improvement wherein the optical system comprises:
   a light source;
   a prism lying in the path of a light beam from said light source, said prism being characterized by a predetermined critical angle and having at least one surface oriented so as to restrict the spread angle of the light beam in a predetermined direction by not reflecting light rays which are incident on that surface at an angle which is less than said predetermined critical angle with respect to the normal to that edge; and
   a lens lying in the path of a light beam transmitted through said prism, said lens being adapted to focus the light beam into a designator mark on the photosensitive surface.

2. The improvement as recited in claim 1, wherein said prism and said lens are integrally formed in a one piece plastic light pipe.

3. The improvement as recited in claim 1, wherein said prism further includes at least one reflective surface for changing the direction of a received light beam by 90°.

4. For use in a photographic copying machine having means for sequentially copying documents onto a photosensitive surface and an optical system for forming a document image designator mark on the photosensitive surface in association with each image of a document, the improvement wherein the optical system comprises:
   a light source; and
   a prism for restricting the spread of a light beam received from said light source in one or more directions to a predetermined spread angle in each direction, said prism being characterized by a predetermined critical angle of reflection and having an entrance surface, an exit surface and one refractive surface corresponding to each such direction for restricting the spread of the light beam in that direction, each such refractive surface being oriented with respect to the centerline of the light beam incident on that surface so that substantially all of the light rays which lie outside the predetermined spread angle in a given direction are incident upon said corresponding refractive surface at an angle with respect to the normal to that refractive surface which is less than the predetermined critical angle, substantially all such light rays which lie outside the predetermined spread angle thereby being refracted by a refractive surface and passing out of the prism at a refractive surface removed from said exit surface, whereas substantially all of the light rays which lie within the predetermined spread angle are incident upon each refractive surface of said prism at an angle greater than the predetermined critical angle, substantially all such light rays thereby being reflected by each said refractive surface and passing out of said prism at said exit surface.

* * * * *

UNITED STATES PATENT OFFICE
CERTIFICATE OF CORRECTION

Patent No. 3,757,653      Dated September 11, 1973

Inventor(s) Richard E. Albrecht   Terrence L. Reeder

It is certified that error appears in the above-identified patent and that said Letters Patent are hereby corrected as shown below:

Column 5, line 32    Delete "edge" and substitute therefor --surface--

Signed and sealed this 25th day of December 1973.

(SEAL)
Attest:

EDWARD M. FLETCHER, JR.
Attesting Officer

RENE D. TEGTMEYER
Acting Commissioner of Patents